United States Patent
Kitadani et al.

(10) Patent No.: US 8,065,982 B2
(45) Date of Patent: Nov. 29, 2011

(54) VARIABLE INTAKE APPARATUS FOR V-TYPE INTERNAL COMBUSTION ENGINE

(75) Inventors: Hironori Kitadani, Nishikamo-gun (JP); Shigeo Takeuchi, Toyota (JP); Masaaki Iinuma, Nishikamo-gun (JP); Shinji Iwata, Obu (JP)

(73) Assignees: Toyota Jidosha Kabushiki Kaisha, Toyota (JP); Aisan Kogyo Kabushiki Kaisha, Obu-shi (JP)

( * ) Notice: Subject to any disclaimer, the term of this patent is extended or adjusted under 35 U.S.C. 154(b) by 509 days.

(21) Appl. No.: 12/309,883

(22) PCT Filed: Aug. 6, 2007

(86) PCT No.: PCT/IB2007/002252
§ 371 (c)(1),
(2), (4) Date: Feb. 2, 2009

(87) PCT Pub. No.: WO2008/017919
PCT Pub. Date: Feb. 14, 2008

(65) Prior Publication Data
US 2009/0250025 A1    Oct. 8, 2009

(30) Foreign Application Priority Data
Aug. 7, 2006    (JP) .................................. 2006-214371

(51) Int. Cl.
*F01L 1/34* (2006.01)
(52) U.S. Cl. .............. 123/90.15; 123/90.16; 123/184.34
(58) Field of Classification Search ............... 123/90.15, 123/90.16, 90.31, 184.34, 184.56
See application file for complete search history.

(56) References Cited

U.S. PATENT DOCUMENTS

| 4,643,138 | A | 2/1987 | Ruf et al. |
| 5,101,792 | A | 4/1992 | Koch |
| 6,718,930 | B2 * | 4/2004 | Ozeki ...................... 123/184.55 |
| 2003/0213464 | A1 | 11/2003 | Geyer et al. |

FOREIGN PATENT DOCUMENTS

| DE | 39 34 906 C1 | 11/1990 |
| EP | 0 177 794 A1 | 4/1986 |

(Continued)

OTHER PUBLICATIONS

Japanese Office Action issued in Application No. 2006-214371; Dated May 12, 2010 (With Translation).

*Primary Examiner* — Zelalem Eshete
(74) *Attorney, Agent, or Firm* — Oliff & Berridge, PLC

(57) ABSTRACT

In a variable intake apparatus for a V-type internal combustion engine, each of plural intake pipes is separated from a surge tank by a partition wall, and communication ports, provided in the partition wall for the respective intake pipes, are opened and closed by respective variable intake valves to adjust length of intake passages. The variable intake valves in one of two parallel rows are offset from the variable intake valves in the other row. The variable intake valves are opened and closed by turning the turning shafts to which the variable intake valves are connected. Further, a synchronization mechanism synchronously turns the turning shafts (5a; 5b), and is connected between the paired turning shafts. The turning motion of one turning shaft is transmitted to the other turning shaft via the synchronization mechanism, and the variable intake valves are synchronously opened and closed.

5 Claims, 9 Drawing Sheets

FOREIGN PATENT DOCUMENTS

| | | |
|---|---|---|
| EP | 1 270 957 A2 | 1/2003 |
| FR | 2 860 550 A1 | 4/2005 |
| JP | U-63-075528 | 5/1988 |
| JP | A-05-302517 | 11/1993 |
| JP | A-07-102979 | 4/1995 |
| JP | B2-08-009969 | 1/1996 |
| JP | A-2000-274321 | 10/2000 |

* cited by examiner

US 8,065,982 B2

VARIABLE INTAKE APPARATUS FOR V-TYPE INTERNAL COMBUSTION ENGINE

BACKGROUND OF THE INVENTION

1. Field of the Invention

The invention relates to a variable intake apparatus for a V-type internal combustion engine, such as a V-eight engine. More specifically, the invention relates to an arrangement of a plurality of valves provided in a variable intake apparatus and a drive mechanism thereof.

2. Description of the Related Art

Generally, a variable intake apparatus for a V-type internal combustion engine in which each of intake pipes is separated from a surge tank by a partition wall is provided. In the variable intake apparatus, communication ports are provided in the partition wall for the respective intake pipes, and opened and closed by respective variable intake valves to adjust the length of intake passages.

For example, Japanese Patent Publication No. 8-9969 describes a technology with respect to such a variable intake apparatus in which a plurality of variable intake valves are arranged in one row, and integrally connected to a single turning shaft. In the variable intake apparatus, the turning shaft is turned by an actuator such that the variable intake valves synchronously open and close the respective communication ports.

However, in the above-described variable intake apparatus, the variable intake valves are arranged in one row, and therefore the length of the variable intake apparatus in the direction in which the variable intake valves are arranged may need to be long enough to accommodate the required number of the variable intake valves. This may increase the size of the variable intake apparatus.

Moreover, if all the variable intake valves are arranged in one row, there is a restriction on the diameter of each valve. Due to this restriction, the requirement for the valve diameter to achieve the desired performance may not be satisfied.

SUMMARY OF THE INVENTION

The invention to provide a variable intake apparatus for a V-type internal combustion engine, whose size is reduced with a simple mechanism without employing a complicated mechanism for driving valves, by devising an effective arrangement of the valves and an effective mechanism for driving the valves.

A first aspect of the invention relates to a variable intake apparatus for a V-type internal combustion engine, in which each of a plurality of intake pipes is separated from a surge tank by a partition wall, and communication ports, provided in the partition wall for the respective intake pipes, are opened and closed by respective variable intake valves to adjust length of intake passages. The variable intake apparatus includes a first turning shaft and a second turning shaft that are disposed substantially parallel with each other. The first and second turning shafts are connected to the variable intake valves, and support the variable intake valves such that the variable intake valves are turned by turning the first and second turning shafts. The variable intake apparatus includes an actuator that turns the first turning shaft, and a synchronization mechanism that connects the first turning shaft and the second turning shaft such that the first and second turning shafts are synchronously turned. In the variable intake apparatus, the variable intake valves connected to the first turning shaft are offset from the variable intake valves connected to the second turning shaft in a direction where the first and second turning shafts extend. A turning motion of the first turning shaft turned by the actuator is transmitted to the second turning shaft via the synchronization mechanism such that the variable intake valves connected to the first and second turning shafts synchronously open and close the respective communication ports.

The variable intake valves connected to one of two turning shafts that are disposed substantially parallel with each other are offset from the variable intake valves connected to the other turning shaft, as described above. Therefore, it is possible to decrease the length in the direction in which the variable intake valves are arranged, as compared to the case where all the variable intake valves are arranged in one row. Further, it is also possible to select the optimal length of the intake passages. Because the synchronization mechanism is provided, the two turning shafts are turned by a single actuator.

In the variable intake apparatus for a V-type internal combustion engine according to the first aspect, the synchronization mechanism may be a synchronization link mechanism.

In the variable intake apparatus for a V-type internal combustion engine according to the first aspect, the synchronization link mechanism may include at least a drive-side operation link connected to the first turning shaft to which the actuator is connected so that the first turning shaft functions as a driving shaft, a driven-side operation link connected to the second turning shaft that functions as a driven shaft, and a connection link that connects the drive-side operation link and the driven-side operation link.

In the variable intake apparatus for a V-type internal combustion engine according to the first aspect, the synchronization link mechanism may further include a connection-side operation link that connects the connection link and the driven-side operation link, and the connection-side operation link may be turnably supported by the second turning shaft that functions as the driven shaft.

In the variable intake apparatus for a V-type internal combustion engine according to the first aspect, the synchronization link mechanism may include at least one of first adjusting means and second adjusting means. The first adjusting means synchronously adjusts turning positions of the first turning shaft and the second turning shaft via the synchronization link mechanism such that the closed positions of the variable intake valves are adjusted. The second adjusting means adjusts the turning position of the first turning shaft and the turning position of the second turning shaft with respect to each other such that the closed position of the variable intake valves connected to the first turning shaft and the closed position of the variable intake valves connected to the second turning shaft are adjusted with respect to each other.

The variable intake apparatus for a V-type internal combustion engine according to the first aspect may further include a valve housing and a contact portion. The valve housing retains the variable intake valves. The contact portion is formed in the drive-side operation link and contacts the first adjusting means when the variable intake valves are placed in the closed positions. In the variable intake apparatus, the first adjusting means may be provided in the valve housing, and a position of the first adjusting means may move in an axial direction of the first adjusting means. A state of the drive-side operation link when the variable intake valves are placed in the closed positions may be adjusted via the contact portion, and the turning positions of the first and second turning shafts may be adjusted via the synchronization link mechanism such that the closed positions of the variable intake valves are adjusted, by adjusting the position of the first adjusting means in the axial direction of the first adjusting means.

The variable intake apparatus for a V-type internal combustion engine according to the first aspect may further include an elastic body provided between an end portion of the driven-side operation link and an end portion of the connection-side operation link. In the variable intake apparatus, the second adjusting means may be connected to the end portion of the driven-side operation link and to the end portion of the connection-side operation link such that the elastic body is provided between the end portion of the driven-side operation link and the end portion of the connection-side operation link. A position of the second adjusting means may move in an axial direction of the second adjusting means. An interval between the end portion of the driven-side operation link and the end portion of the connection-side operation link, which are connected with each other via the elastic body, may be changed such that the turning position of the first turning shaft and the turning position of the second turning shaft are adjusted with respect to each other, and the closed position of the variable intake valves connected to the first turning shaft and the closed position of the variable intake valves connected to the second turning shaft are adjusted with respect to each other, by adjusting the position of the second adjusting means in the axial direction of the second adjusting means.

A variable intake apparatus for a V-type internal combustion engine according to a second aspect of the invention includes a plurality of intake pipes, a surge tank, a partition wall, communication ports, variable intake valves, a first turning shaft and a second turning shaft, an actuator, and a synchronization mechanism. The partition wall separates each of the intake pipes from the surge tank. The communication ports are provided in the partition wall for the respective intake pipes, and provide communication between the respective intake pipes and the surge tank. The variable intake valves open and close the respective communication ports to adjust length of intake passages. The first and second turning shafts are disposed substantially parallel with each other, and connected to the variable intake valves. The first and second turning shafts support the variable intake valves such that the variable intake valves are turned by turning the first and second turning shafts. The actuator turns the first turning shaft. The synchronization mechanism connects the first turning shaft and the second turning shaft such that the first and second turning shafts are synchronously turned. In the variable intake apparatus, the variable intake valves connected to the first turning shaft are offset from the variable intake valves connected to the second turning shaft in a direction where the first and second turning shafts extend, and a turning motion of the first turning shaft turned by the actuator is transmitted to the second turning shaft via the synchronization mechanism such that the variable intake valves connected to the first and second turning shafts synchronously open and close the respective communication ports.

In the variable intake apparatus for a V-type internal combustion engine according to the second aspect, the synchronization mechanism may be a synchronization link mechanism.

In the variable intake apparatus for a V-type internal combustion engine according to the second aspect, the synchronization link mechanism may include at least a drive-side operation link connected to the first turning shaft to which the actuator is connected so that the first turning shaft functions as a driving shaft, a driven-side operation link connected to the second turning shaft that functions as a driven shaft, and a connection link that connects the drive-side operation link and the driven-side operation link.

In the variable intake apparatus for a V-type internal combustion engine according to the second aspect, the synchronization link mechanism may further include a connection-side operation link that connects the connection link and the driven-side operation link, and the connection-side operation link may be turnably supported by the second turning shaft that functions as the driven shaft.

In the variable intake apparatus for a V-type internal combustion engine according to the second aspect, the synchronization link mechanism may include at least one of first adjusting portion and second adjusting portion. The first adjusting portion synchronously adjusts turning positions of the first turning shaft and the second turning shaft via the synchronization link mechanism such that the closed positions of the variable intake valves are adjusted. The second adjusting portion adjusts the turning position of the first turning shaft and the turning position of the second turning shaft with respect to each other such that the closed position of the variable intake valves connected to the first turning shaft and the closed position of the variable intake valves connected to the second turning shaft are adjusted with respect to each other.

The variable intake apparatus for a V-type internal combustion engine according to the second aspect may further include a valve housing and a contact portion. The valve housing retains the variable intake valves. The contact portion is formed in the drive-side operation link and contacts the first adjusting portion when the variable intake valves are placed in the closed positions. In the variable intake apparatus, the first adjusting portion may be provided in the valve housing, and a position of the first adjusting portion may move in an axial direction of the first adjusting portion. A state of the drive-side operation link when the variable intake valves are placed in the closed positions may be adjusted via the contact portion, and the turning positions of the first and second turning shafts may be adjusted via the synchronization link mechanism such that the closed positions of the variable intake valves are adjusted, by adjusting the position of the first adjusting portion in the axial direction of the first adjusting portion.

The variable intake apparatus for a V-type internal combustion engine according to the second aspect may further include an elastic body provided between an end portion of the driven-side operation link and an end portion of the connection-side operation link. In the variable intake apparatus, the second adjusting portion may be connected to the end portion of the driven-side operation link and to the end portion of the connection-side operation link such that the elastic body is provided between the end portion of the driven-side operation link and the end portion of the connection-side operation link. A position of the second adjusting portion may move in an axial direction of the second adjusting portion. An interval between the end portion of the driven-side operation link and the end portion of the connection-side operation link, which are connected with each other via the elastic body, may be changed such that the turning position of the first turning shaft and the turning position of the second turning shaft are adjusted with respect to each other, and the closed position of the variable intake valves connected to the first turning shaft and the closed position of the variable intake valves connected to the second turning shaft are adjusted with respect to each other, by adjusting the position of the second adjusting portion in the axial direction of the second adjusting portion.

According to the invention, the variable intake valves connected to one of two turning shafts that are disposed substantially parallel with each other are offset from the variable intake valves connected to the other turning shaft, as described above. Therefore, it is possible to decrease the length in the direction in which the variable intake valves are arranged, as compared to the case where all the variable intake valves are arranged in one row. Further, it is also possible to select the optimal length of the intake passages. Thus, the degree of freedom in layout of components for the variable intake apparatus is increased, and the flow of intake air is optimized. Accordingly, the required engine performance is optimized in a wide range (to achieve higher output).

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF THE EXAMPLE EMBODIMENTS

Hereinafter, an embodiment of the invention will be described with reference to the drawings.

Figure 1:
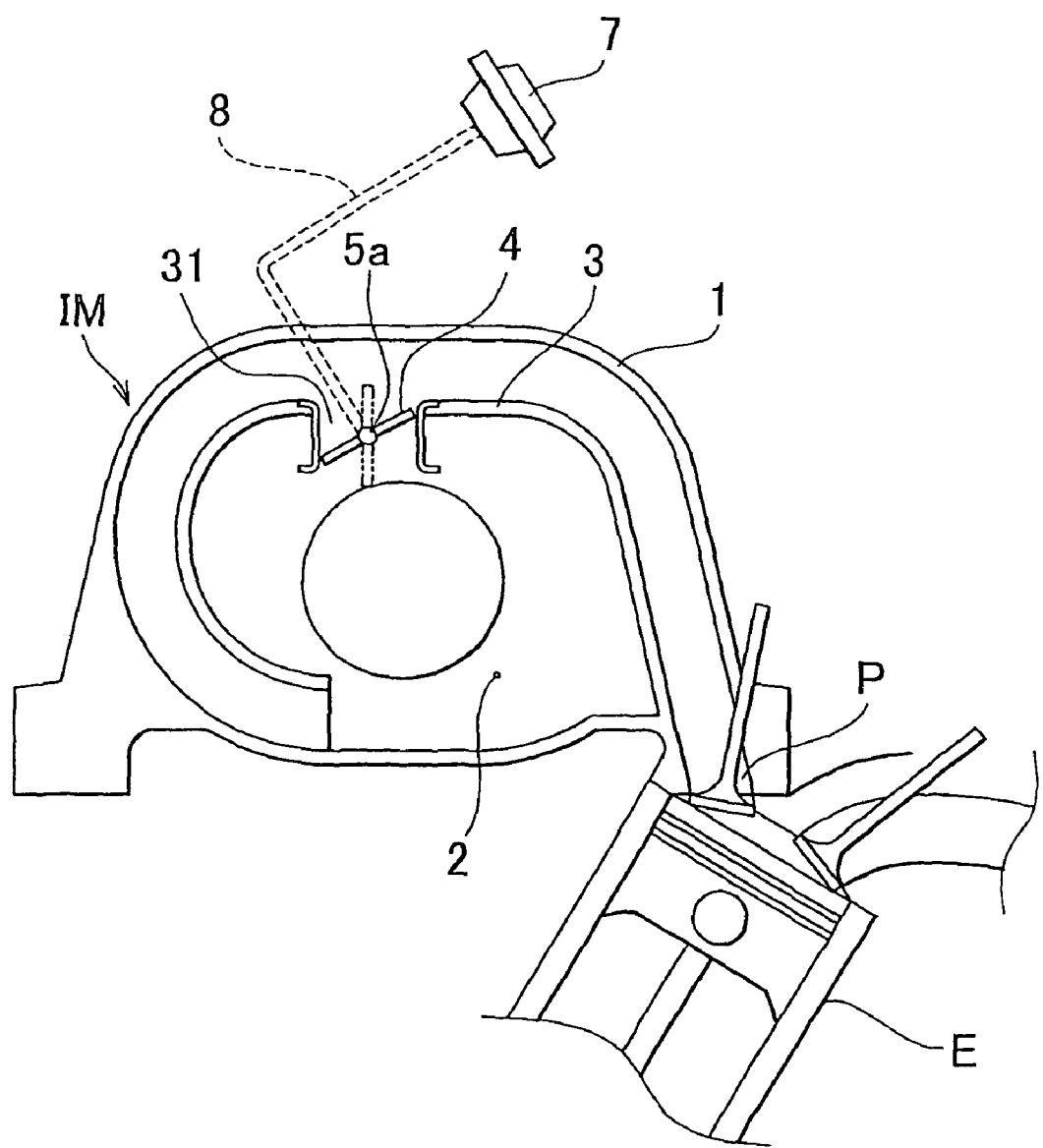
FIG. 1 is a diagram showing the schematic configuration of an intake manifold including a variable intake apparatus for an internal combustion engine according to an embodiment of the invention.
Figure 2:
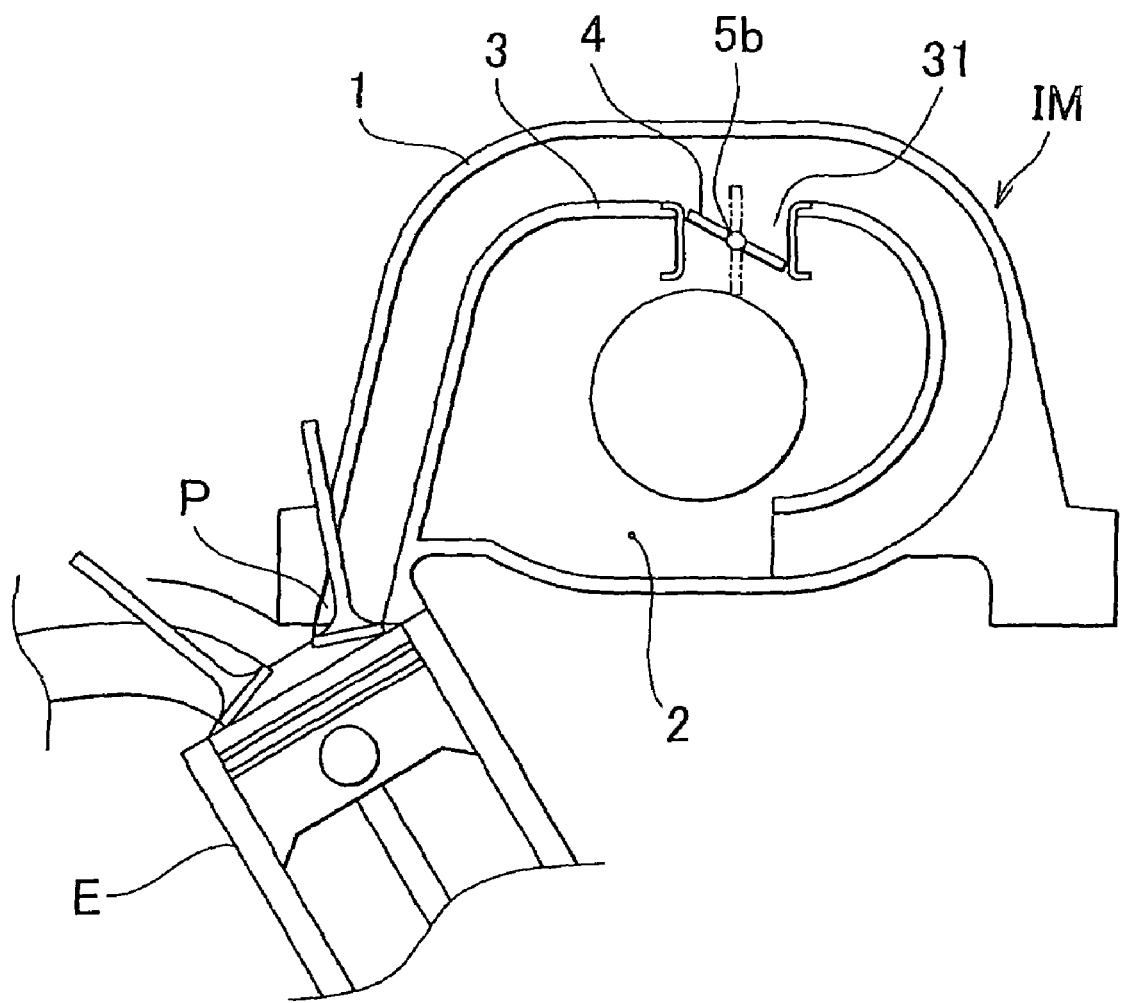
FIG. 2 is a diagram showing the schematic configuration of the intake manifold including the variable intake apparatus for an internal combustion engine according to the embodiment of the invention.

Each of FIG. 1 and FIG. 2 shows the schematic configuration of an intake manifold including a variable intake apparatus for a V-type internal combustion engine according to the embodiment of the invention.

As the V-type internal combustion engine, for example, a V-eight engine is used. The variable intake apparatus according to the embodiment of the invention is applied to the V-eight engine.

The intake manifold IM includes a plurality of intake pipes 1. The number of the intake pipes 1 depends on the number of cylinders of the V-type internal combustion engine. Each of the intake pipes 1 is separated from a surge tank 2 by a partition wall 3. Communication ports 31, provided in the partition wall 3 for the respective intake pipes 1, are opened and closed by respective variable intake valves 4 of the variable intake apparatus to adjust the length of intake passages.

The above-described variable intake valves 4 adjust the length of the intake passages through which air is introduced into intake ports P of the V-type internal combustion engine E from the surge tank 2.

Figure 3:
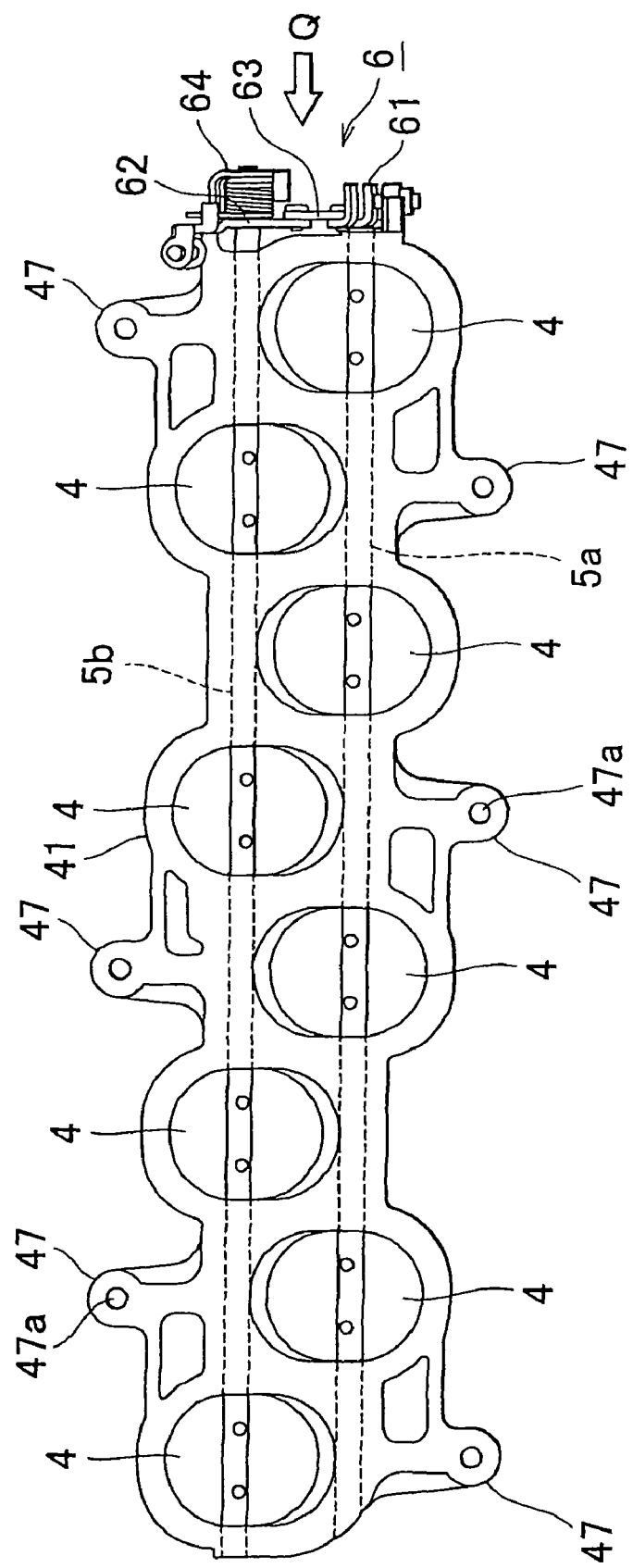
FIG. 3 is a plan view showing a situation where variable intake valves are disposed according to the embodiment of the invention.
Figure 4:
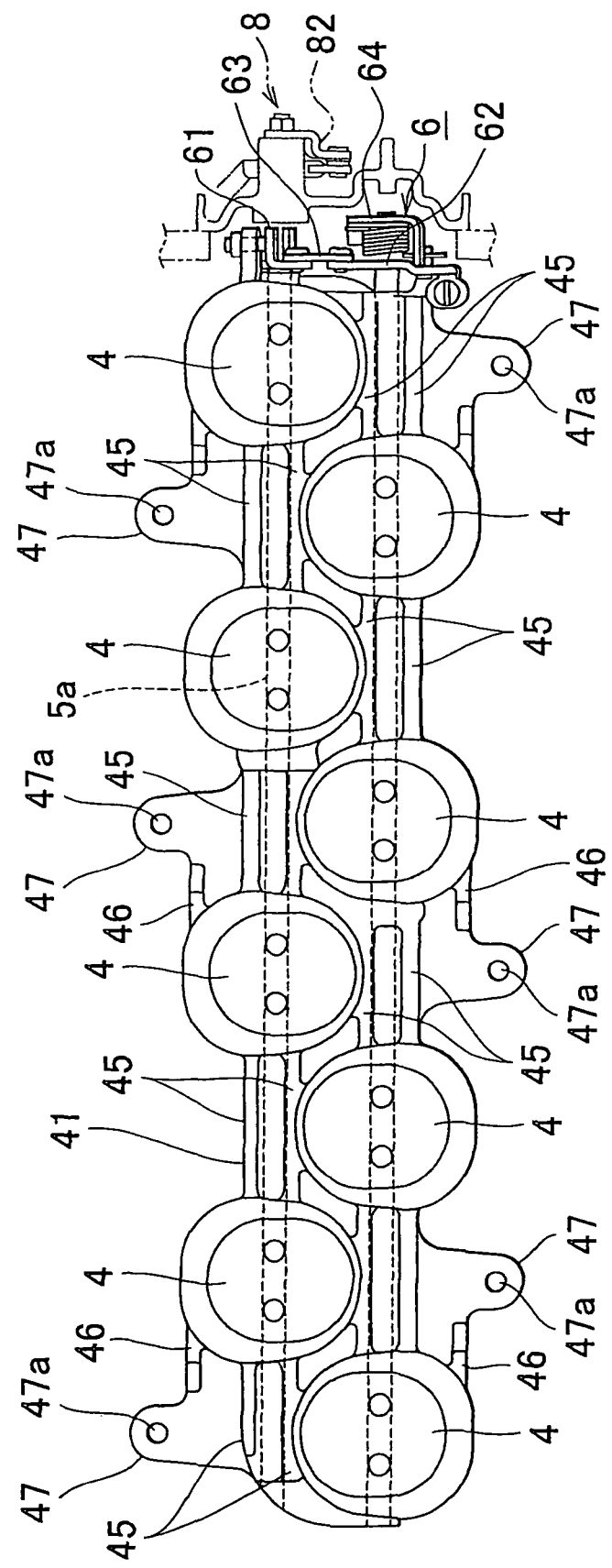
FIG. 4 is a bottom view showing the situation where variable intake valves are disposed according to the embodiment of the invention.

More specifically, when the V-eight engine is used as the V-type internal combustion engine, the eight variable intake valves 4 are provided in a valve housing 41, as shown in FIG. 3 and FIG. 4. That is, the number of the variable intake valves 4 is the same as the number of cylinders. All the variable intake valves 4 are disposed in two parallel rows, that is, the four variable intake valves 4 are disposed in one row, and the four variable intake valves 4 are disposed in the other row. The variable intake valves 4 in one row are offset from the variable intake valves 4 in the other row. That is, in FIG. 1 showing the intake manifold, the variable intake valve 4 disposed in one row is shown. In FIG. 2 showing the intake manifold, the variable intake valve 4 disposed in the other row (the row on the opposite side) is shown. FIG. 3 is a plan view of the valve housing 41 viewed from above. FIG. 4 is a bottom view of the valve housing 41 viewed from below.

Figure 9:
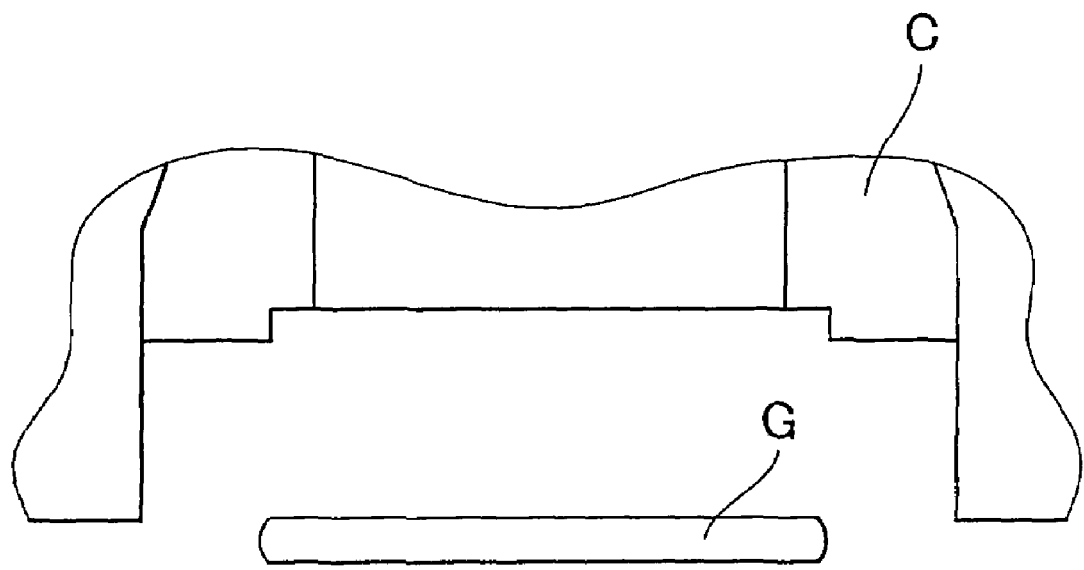
FIG. 9 is a front view showing a valve housing and an upper cover that are fitted to each other via a gasket according to the embodiment of the invention.
Figure 9:
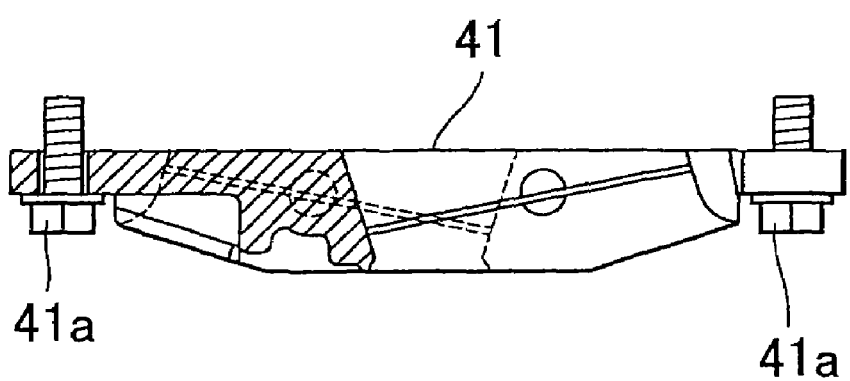

The valve housing 41 is fastened to an upper cover C, which is a constituent component of the intake manifold, via a gasket G using blots 41a, as shown in FIG. 9. The upper cover C forms the upper portions of the intake pipes of the intake manifold IM.

The variable intake valves 4 in the rows are connected to turning shafts 5a and 5b. The turning shafts 5a and 5b are inserted in the valve housing 41 and retained by the valve housing 41. The turning shaft 5a may be regarded as the first turning shaft according to the invention, and the turning shaft 5b may be regarded as the second turning shaft according to the invention.

That is, the variable intake valves 4 are axially supported by the two turning shafts 5a and 5b that are substantially parallel with each other. The variable intake valves 4 disposed along the turning shaft 5a are offset from the variable intake valves 4 disposed along the turning shaft 5b in the direction where the turning shafts 5a and 5b extend. Further, the variable intake valves 4 are connected to the turning shafts 5a and 5b.

One turning shaft 5a is turned by an actuator 7 (described later), and both of the turning shafts 5a and 5b are synchronously turned via a synchronization link mechanism 6 that is the synchronization mechanism. Thus, the variable intake valves 4 are synchronously operated to open and close the communication ports 31.

At low engine speed, the variable intake valves 4 thus disposed increase the length of the intake passages by closing the communication ports 31, as shown by the solid lines in FIG. 1 and FIG. 2. As a result, at low-to-intermediate engine speed, air-intake efficiency is improved due to an intake air inertia effect, and thus the output from the engine is increased.

At high engine speed, the variable intake valves 4 decrease the length of the intake passages by opening the communication ports 31, as shown by the two dot chain lines in FIG. 1 and FIG. 2. As a result, the air-intake efficiency reaches a peak at high engine speed. Thus, the output from the engine is increased at high engine speed.

The turning shaft 5a, which is one of the above-described turning shafts 5a and 5b, is turned by the actuator 7 (described later) to drive the other turning shaft 5b. Thus, the turning shaft 5a will be referred to as "drive-side shaft 5a", and the other turning shaft 5b will be referred to as "driven-side shaft 5b".

Figure 5:
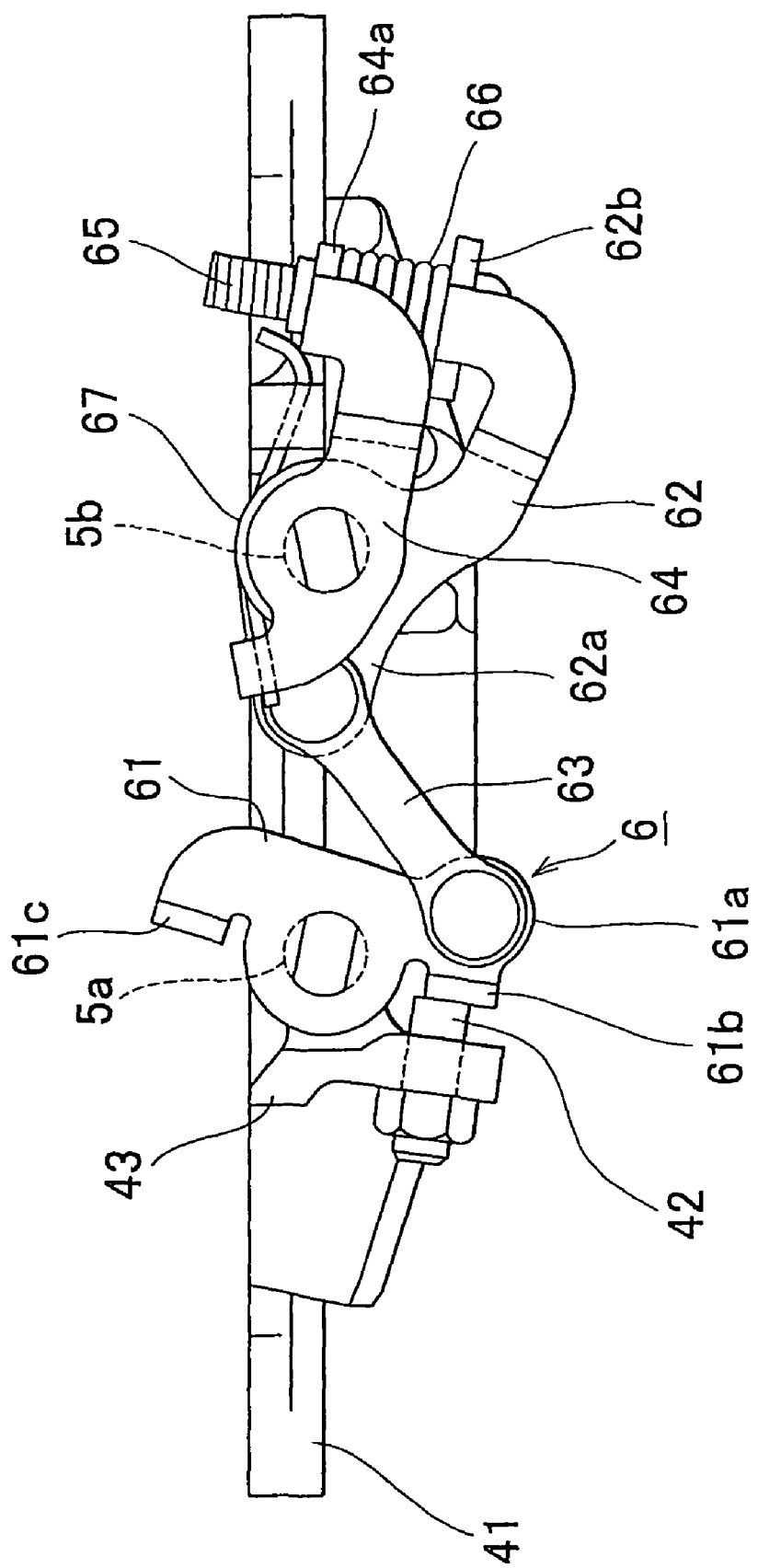
FIG. 5 is a diagram showing the configuration of a synchronization link mechanism according to the embodiment of the invention, which is viewed in the direction shown by the arrow Q in FIG. 3.
Figure 6:
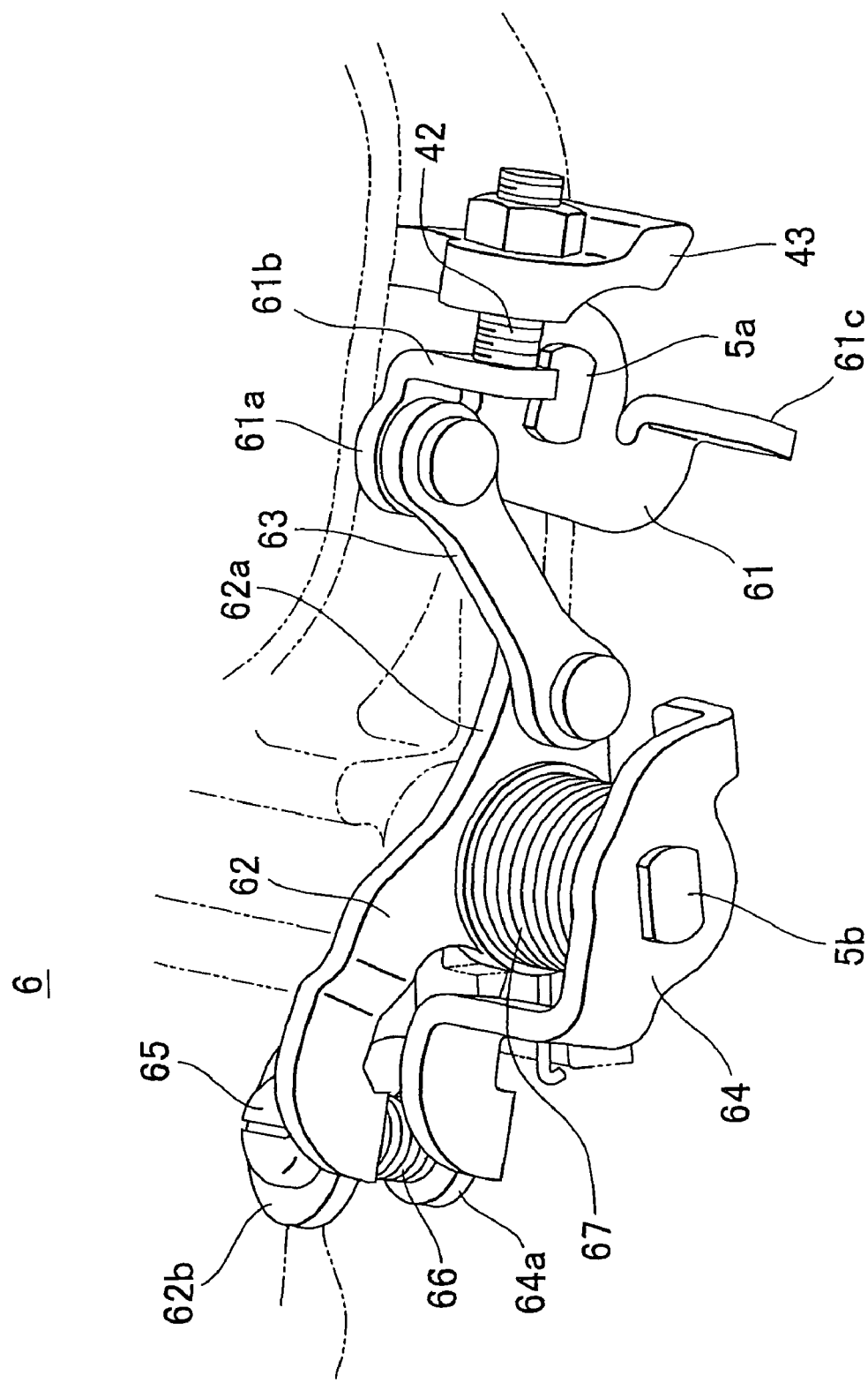
FIG. 6 is a perspective view showing the synchronization link mechanism when a valve housing is viewed from the bottom surface.

As shown in FIG. 5 and FIG. 6, the synchronization link mechanism 6 is disposed between, and connected to one end portions (right end portions in FIG. 3 and FIG. 4) of the paired drive-side shaft 5a and driven-side shaft 5b. FIG. 5 is a diagram viewed in the direction shown by the arrow Q in FIG. 3. FIG. 6 is a perspective view of the synchronization link mechanism when the valve housing is viewed from the bottom surface-side.

In each of FIG. 5 and FIG. 6, the synchronization link mechanism 6 includes a drive-side operation link 61, a connection-side operation link 62, a connection link 63, and a driven-side operation link 64. A portion of the drive-side operation link 61 is integrally supported by the one end portion of the drive-side shaft 5a. A portion of the connection-side operation link 62 is turnably supported by the one end portion of the driven-side shaft 5b. The connection link 63 is connected to one end portion 61a of the drive-side operation link 61, and one end portion 62a of the connection-side operation link 62. A portion of the driven-side operation link 64 is integrally supported by one end of the driven-side shaft 5b, which is positioned outside the connection-side operation link 62. The other end portion 62b of the connection-side operation link 62 is connected to one end portion 64a of the driven-side operation link 64.

In the drive-side operation link 61, a contact portion 61b is formed in the one end portion 61a, and a contact portion 61c is formed in the other end portion. The contact portion 61b contacts the end of a stopper screw 42 that is the first adjusting means, and provided in the valve housing 41. The contact portion 61c contacts a stopper portion 43 provided in the valve housing 41. When the contact portion 61b of the drive-side operation link 61 contacts the stopper screw 42, the variable intake valves 4 are placed in the closed positions. When the contact portion 61c of the drive-side operation link 61 contacts the stopper portion 43, the variable intake valves 4 are placed in the open positions (refer to FIG. 7). It should be noted that when the variable intake valves 4 are placed in the closed positions, the communication ports 31 may be fully closed, or may be slightly open due to adjustment of the positions of the stopper screw 42 (first adjusting means) and the screw member 65 (second adjusting means) performed by turning the stopper screw 42 and the screw member 65, respectively. Adjustment of the stopper screw 42 and the screw member 65 will be described later.

Further, the other end portion 62b of the connection-side operation link 62, and the one end portion 64a of the driven-side operation link 64 are disposed at a predetermined interval, and connected to each other by a screw member 65 that is the second adjusting means. A spring 66 is disposed between the other end portion 62b of the connection-side operation link 62 and the one end portion 64a of the driven-side operation link 64 such that the spring 66 is fitted to the outer periphery of the screw member 65.

It should be noted that both of the stopper screw 42 that is the first adjusting means and the screw member 65 that is the second adjusting means may be employed, or either of the stopper screw 42 or the screw member 65 may be employed.

Figure 7:
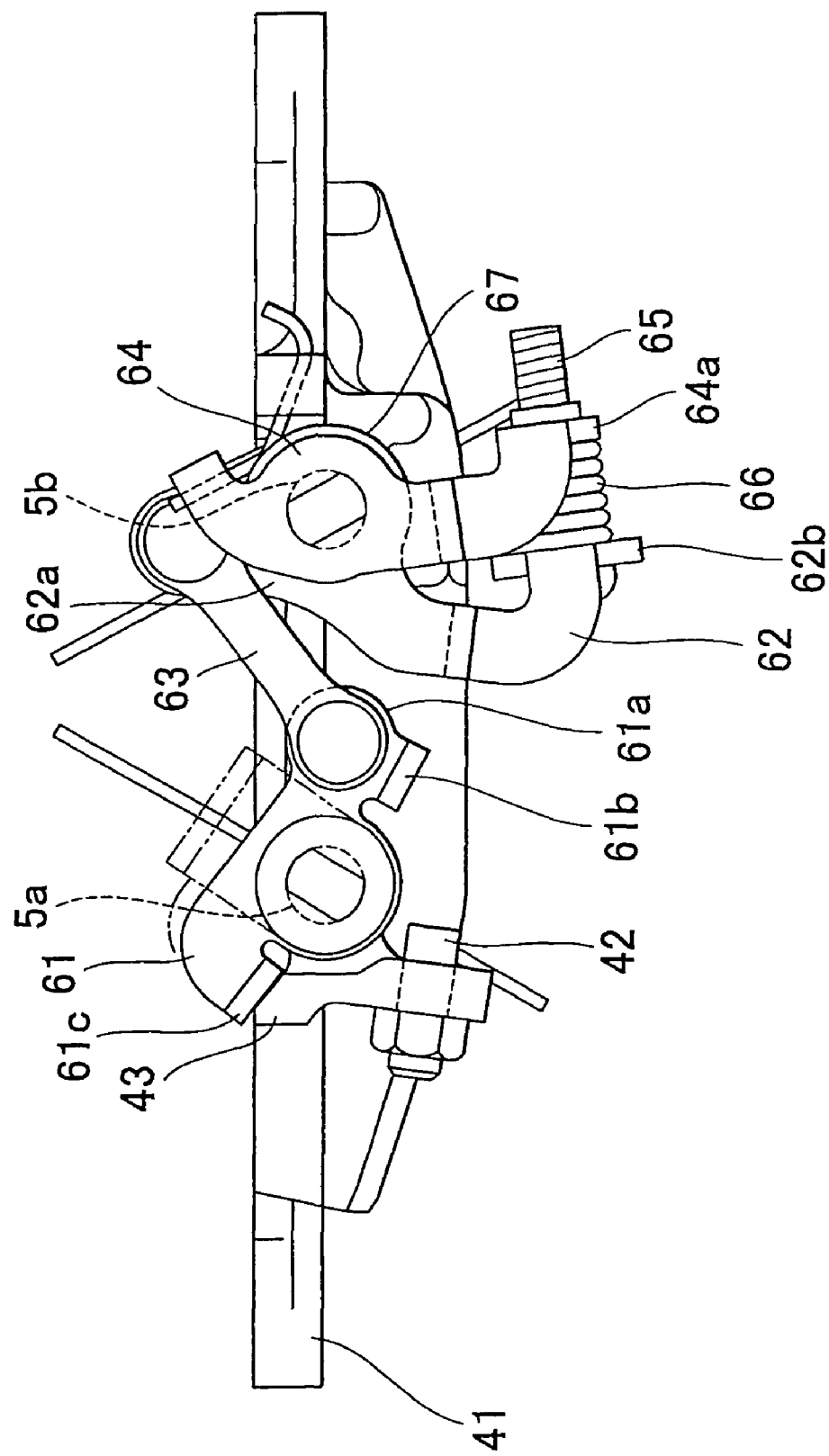
FIG. 7 is a diagram showing the operation of the synchronization link mechanism according to the embodiment of the invention, which is viewed in the direction shown by the arrow Q in FIG. 3.

A spring 67 is disposed between the portion of the connection-side operation link 62 and the portion of the driven-side operation link 64 such that the spring 67 is fitted to the outer periphery of the one end portion of the driven-side shaft 5b. The spring 67 presses the driven-side operation link 64 in such a direction that the variable intake valves 4 are placed in the open position, as shown in FIG. 7.

Accordingly, when the synchronization link mechanism 6 is placed in such a state that the variable intake valves 4 are placed in the closed positions as shown in FIG. 5, and then the position of the stopper screw 42 is adjusted by turning the stopper screw 42 to adjust the turning position of the drive-side shaft 5a via the drive-side operation link 61, and to adjust the turning position of the driven-side shaft 5b via the synchronization link mechanism 6, the closed positions (opening degrees) of the variable intake valves 4 are adjusted.

When the synchronization link mechanism 6 is placed in such a state that the variable intake valves 4 are placed in the closed positions as shown in FIG. 5, and then the position of the screw member 65 is adjusted by turning the screw member 65 to change the interval between the other end portion 62b of the connection-side operation link 62 and the one end portion 64a of the driven-side operation link 64, and to adjust the turning position of the driven-side operation link 64 with respect to the turning position of the connection-side operation link 62, the closed position of the variable intake valves 4 connected to the driven-side shaft 5b is adjusted via the driven-side shaft 5b. That is, the turning position of the drive-side shaft (one turning shaft) 5a and the turning position of the driven-side shaft (the other turning shaft) 5b are adjusted with respect to each other by adjusting the position of the screw member 65. As a result, the closed position of the variable intake valves 4 connected to the drive-side shaft 5a and the closed position of the variable intake valves 4 connected to the driven-side shaft 5b are adjusted with respect to each other. In this way, when there is a difference between the closed position of the variable intake valves 4 connected to the drive-side shaft 5a and the closed position of the variable intake valves 4 connected to the driven-side shaft 5b, such a difference can be adjusted.

Figure 8:
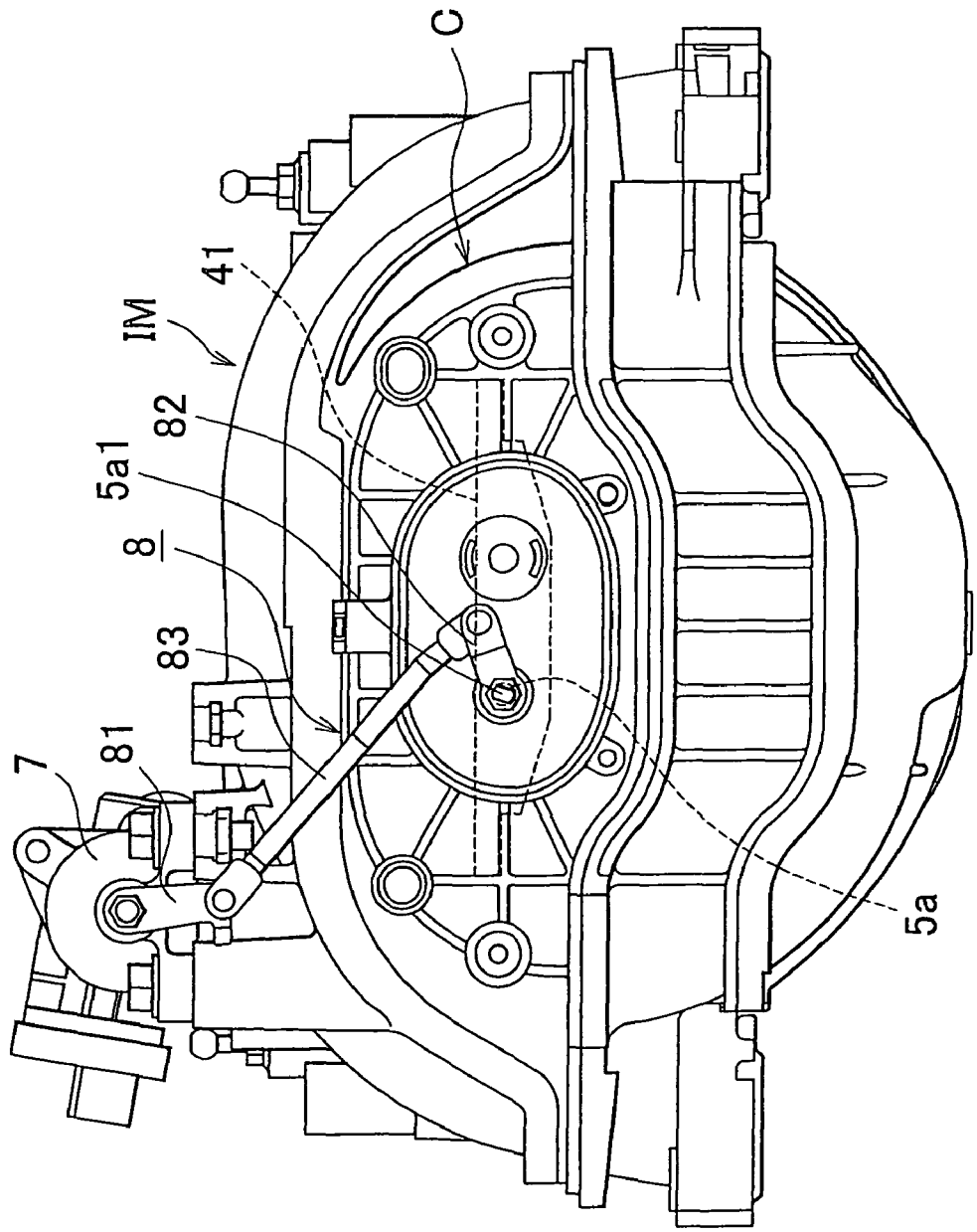
FIG. 8 is an outline view showing a situation where an actuator is disposed according to the embodiment of the invention when the intake manifold is viewed from the lateral side.

The actuator 7 is connected to the drive-side shaft 5a via coupling means 8 as shown in FIG. 8. When the actuator 7 brings the synchronization link mechanism 6 from the state shown in FIG. 5 to the state shown in FIG. 7 using the force of the spring 67 via the coupling means 8 and the drive-side shaft 5a, the variable intake valves 4 are brought from the closed positions to the open positions.

More specifically, the coupling means 8 includes operation arms 81 and 82, and a connection rod 83. The base end portion of the operation arm 81 is connected to the output shaft of the actuator 7 such as an electric motor. The base end portion of the operation arm 82 is connected to a protrusion portion 5a1 that protrudes from the one end of the drive-side shaft 5a toward the lateral side of the upper cover C. The connection rod 83 connects the end portions of the operation arms 81 and 82. Thus, when the operation arm 81 is turned in the clockwise direction by the actuator 7 in FIG. 8, and the operation arm 82 is turned in the counter clockwise direction via the connection rod 83, the drive-side shaft 5a is turned, and the driven-side shaft 5b is turned via the synchronization link mechanism 6 as described above. Thus, the variable intake valves 4 are brought from the closed positions to the open positions. When the operation arm 81 is turned in the opposite direction, the variable intake valves 4 are brought from the open positions to the closed positions.

All the variable intake valves 4 are disposed in two parallel rows such that the variable intake valves 4 in one row are offset from the variable intake valves 4 in the other row, as described above. Therefore, it is possible to decrease the length in the direction in which the variable intake valves 4 are arranged, as compared to the case where all the variable intake valves are arranged in one row. Further, it is also possible to select the optimal length of the intake passages. Thus, the degree of freedom in layout of components for the variable intake apparatus is increased, and the flow of intake air is optimized. Accordingly, the required engine performance is optimized in a wide range (to achieve higher output).

Also, the synchronization link mechanism 6 is disposed in a space formed by decreasing the length in the direction in which the variable intake valves 4 are arranged. Further, the turning shafts 5a and 5b are turned by one actuator 7. Thus, with the simple configuration, it is possible to open and close the communication ports 31 by synchronously operating the variable intake valves 4 while maintaining the compact size.

Further, the closed positions of all the variable intake valves 4 are adjusted using the stopper screw 42. Also, the closed position of the variable intake valves 4 in one row is adjusted with respect to the closed position of the variable intake valves 4 in the other row, using the screw member 65. Thus, it is possible to easily and quickly adjust the difference in the closed position caused due to use, and to constantly operate the variable intake apparatus in an appropriate state.

As shown in FIG. 4, a plurality of ribs 45 and 46 is formed on the bottom surface of the valve housing 41.

More specifically, in the valve housing 41, the ribs 45 are formed in an area between each pair of the adjacent variable intake valves 4, and the turning shaft 5a or 5b extends through the area. The ribs 45 are parallel with the turning shafts 5a and 5b.

Also, fastening portions 47 are formed in the periphery of the valve housing 41. Installation holes 47a are formed in the respective fastening portions 47. The valve housing 41 is fastened to the upper cover C by screwing the bolts 41a into the installation holes 47a. The rib 46 is formed in an area of the valve housing 41, which is close to one of the communication ports 31 that is close to each of the fastening portions 47.

The valve housing 41 is generally made of metal to ensure the rigidity. The intake manifold IM is generally made of resin to reduce the weight.

Thus, when the valve housing 41 made of metal is fitted to the upper cover C that constitutes a part of the intake manifold IM made of resin, mainly the ribs 45 ensure the accuracy of installing the variable intake valves 4, and prevent the deformation of the turning shafts 5a and 5b such that the sliding resistance is reduced. Further, when the valve housing 41 and the upper cover C are fastened to each other, both of the ribs 45 and 46 prevent the separation of the upper cover C from the valve housing 41. Thus, the valve housing 41 and the upper cover C are appropriately fitted to each other while the gasket G closely contacts the valve housing 41 and the upper cover C. That is, the valve housing 41 is appropriately fitted to the upper cover C by providing the ribs 45 and 46 in the main portions that need to have high rigidity while reducing the rigidity of the entire valve housing 41. Also, the weight of the valve housing 41 itself is reduced.

The above-described embodiments are example embodiments of the invention. The invention is not limited to the above-described embodiments. Various modifications may be made to the design in the scope of the invention.

For example, the synchronization mechanism is not limited to the synchronization link mechanism 6. Any mechanism that synchronously turns a pair of turning shafts, such as a mechanism using gears and a mechanism using a combination of gears and links, may be employed.

While the invention has been described with reference to exemplary embodiments thereof, it should be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A variable intake apparatus for a V-type internal combustion engine, comprising:
    a plurality of intake pipes;
    a surge tank;
    a partition wall that separates each of the intake pipes from the surge tank;
    communication ports that are provided in the partition wall for the respective intake pipes, and that provide communication between the respective intake pipes and the surge tank;
    variable intake valves that open and close the respective communication ports to adjust length of intake passages;
    a first turning shaft and a second turning shaft, disposed substantially parallel with each other, which are connected to the variable intake valves, and which support the variable intake valves such that the variable intake valves are turned by turning the first and second turning shafts;
    an actuator that turns the first turning shaft; and
    a synchronization mechanism that connects the first turning shaft and the second turning shaft such that the first and second turning shafts are synchronously turned,
    wherein:
    the variable intake valves connected to the first turning shaft are offset from the variable intake valves connected to the second turning shaft in a direction where the first and second turning shafts extend; and
    a turning motion of the first turning shaft turned by the actuator is transmitted to the second turning shaft via the synchronization mechanism such that the variable intake valves connected to the first and second turning shafts synchronously open and close the respective communication ports;
    the synchronization mechanism is a synchronization link mechanism; and
    the synchronization link mechanism includes at least one of:
    a first adjusting portion that synchronously adjusts turning positions of the first turning shaft and the second turning shaft via the synchronization link mechanism such that closed positions of the variable intake valves are adjusted; and
    a second adjusting portion that adjusts the turning position of the first turning shaft and the turning position of the second turning shaft with respect to each other such that the closed position of the variable intake valves connected to the first turning shaft and the closed position of the variable intake valves connected to the second turning shaft are adjusted with respect to each other.

2. The variable intake apparatus for a V-type internal combustion engine according to claim 1, wherein the synchronization link mechanism includes at least a drive-side operation link connected to the first turning shaft to which the actuator is connected so that the first turning shaft functions as a driving shaft, a driven-side operation link connected to the second turning shaft that functions as a driven shaft, and a connection link that connects the drive-side operation link and the driven-side operation link.

3. The variable intake apparatus for a V-type internal combustion engine according to claim 2, wherein:
    the synchronization link mechanism further includes a connection-side operation link that connects the connection link and the driven-side operation link; and
    the connection-side operation link is turnably supported by the second turning shaft that functions as the driven shaft.

4. The variable intake apparatus for a V-type internal combustion engine according claim 1, further comprising:
a valve housing that retains the variable intake valves; and
a contact portion that is formed in the drive-side operation link and contacts the first adjusting portion when the variable intake valves are placed in the closed positions, wherein:
the first adjusting portion is provided in the valve housing, and a position of the first adjusting portion moves in an axial direction of the first adjusting portion; and
a state of the drive-side operation link when the variable intake valves are placed in the closed position is adjusted via the contact portion, and the turning positions of the first and second turning shafts are adjusted via the synchronization link mechanism such that the closed positions of the variable intake valves are adjusted, by adjusting the position of the first adjusting portion in the axial direction of the first adjusting portion.

5. The variable intake apparatus for a V-type internal combustion engine according to claim 1, further comprising an elastic body provided between an end portion of the driven-side operation link and an end portion of the connection-side operation link, wherein:
the second adjusting portion is connected to the end portion of the driven-side operation link and to the end portion of the connection-side operation link such that the elastic body is provided between the end portion of the driven-side operation link and the end portion of the connection-side operation link, and a position of the second adjusting portion moves in an axial direction of the second adjusting portion; and
an interval between the end portion of the driven-side operation link and the end portion of the connection-side operation link, which are connected with each other via the elastic body, is changed such that the turning position of the first turning shaft and the turning position of the second turning shaft are adjusted with respect to each other, and the closed position of the variable intake valves connected to the first turning shaft and the closed position of the variable intake valves connected to the second turning shaft are adjusted with respect to each other, by adjusting the position of the second adjusting portion in the axial direction of the second adjusting portion.

* * * * *